United States Patent
Jain et al.

(10) Patent No.: US 8,645,730 B2
(45) Date of Patent: Feb. 4, 2014

(54) SYSTEMS AND METHODS TO IMPROVE POWER EFFICIENCY IN HYBRID STORAGE CLUSTERS

(75) Inventors: Bhushan P. Jain, Hinjewadi (IN); Abhinay R. Nagpal, Hadapsar (IN); Sandeep R. Patil, Elmsford, NY (US); Sri Ramanathan, Lutz, FL (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 492 days.

(21) Appl. No.: 12/887,129

(22) Filed: Sep. 21, 2010

(65) Prior Publication Data
US 2012/0072744 A1 Mar. 22, 2012

(51) Int. Cl.
G06F 1/32 (2006.01)

(52) U.S. Cl.
USPC ......................................................... 713/320

(58) Field of Classification Search
USPC ................................................ 713/320, 300
See application file for complete search history.

(56) References Cited

U.S. PATENT DOCUMENTS

| | | | |
|---|---|---|---|
| 7,093,280 B2 * | 8/2006 | Ke et al. ............................. | 726/3 |
| 7,412,369 B1 * | 8/2008 | Gupta ............................. | 703/14 |
| 7,472,302 B2 | 12/2008 | Hu et al. | |
| 7,669,026 B2 * | 2/2010 | Boss et al. ..................... | 711/165 |
| 7,996,640 B2 * | 8/2011 | Shibayama et al. .......... | 711/165 |
| 2002/0052950 A1 * | 5/2002 | Pillai et al. ..................... | 709/224 |
| 2009/0106571 A1 | 4/2009 | Low et al. | |
| 2009/0254660 A1 | 10/2009 | Hanson et al. | |

OTHER PUBLICATIONS

IBM, "Routing transaction and requests to systems depending on Watts per transaction", IP.com PriorArtDatabase, Jun. 3, 2009 (3 pages).

IBM, "Managing Data center power efficiency using green machine profiling", IP.com PriorArtDatabase, Mar. 3, 2009 (3 pages).

* cited by examiner

*Primary Examiner* — Kim Huynh
*Assistant Examiner* — Eric Chang
(74) *Attorney, Agent, or Firm* — Matthew Chung; Roberts Mlotkoski Safran & Cole P.C.

(57) ABSTRACT

Systems and methods for reducing power consumption and power leakage in hybrid storage clusters is provided. More specifically, the systems and methods for reducing power consumption select a particular cache (memory) technology in hybrid storage clusters based on performance requirements and/or other parameters associated with an application (file or process). The method can be implemented in a computer infrastructure having computer executable code tangibly embodied on a computer readable storage medium having programming instructions. The program instructions are operable to monitor access patterns of one or more applications in one or more memory technologies in a computing system. The program instructions are also operable to select a memory technology to store the one or more applications based on the access patterns of one or more applications.

20 Claims, 4 Drawing Sheets

SRAM vs. MRAM

| Configuration | 4-Gbank SRAM | 4-Gbank MRAM |
|---|---|---|
| Capacity | 128KB | 512KB |
| Read latency | 2.25ns | 2.32ns |
| Write latency | 2.56ns | 11.6ns |
| Read energy | 0.90nJ | 0.86nJ |
| Write energy | 0.83nJ | 4.86nJ |

| Cache Configuration | Leakage Power |
|---|---|
| 2MB (16×128KB) SRAM cache | 1.36W |
| 8MB (16×512KB) MRAM cache | 0.26W |

- Pros: Low leakage power, high density.
- Cons: Long write latency and large write energy.

FIG. 1

| | SRAM | eDRAM | PRAM | MRAM |
|---|---|---|---|---|
| Density | Low | High | Very High | High |
| Speed (read) | Very fast | Fast | Slow | Fast |
| Speed (write) | Very fast | Fast | Very slow | Slow |
| Dynamic Power (read) | Low | Medium | Medium | Low |
| Dynamic Power (write) | Low | Medium | High | Very high |
| Leakage Power | High | Medium | Low | Low |

SYSTEMS AND METHODS TO IMPROVE POWER EFFICIENCY IN HYBRID STORAGE CLUSTERS

TECHNICAL FIELD

The present invention relates to systems and methods for reducing power consumption and power leakage in hybrid storage clusters and more particularly, to systems and methods for reducing power consumption by selecting a particular cache (memory) technology in hybrid storage clusters based on performance requirements and/or other parameters associated with an application (file or process).

BACKGROUND

Energy and load management for data centers is a major client issue. These management issues pose complex problems since data centers use many different types of data storage and file sharing systems, each having their own strengths and weaknesses. For example, data centers may use Network File Systems (NFS) and/or cloud computing paradigms, each requiring load management schemes to make them more efficient. However, various schemes used for load management such as, for example, round robin techniques, closest geographic vicinity schemes, and random location schemes, amongst other schemes, do not take into account energy management issues.

In recent years there have been advances in RAM technology. For example, newer memories, e.g., Phase change Memory, may be better at some properties but cannot replace the existing technologies completely. For this reason, amongst others, all the RAM technologies have to co-exist in the same architecture or system leading to a hybrid structure. RAM technologies are discussed below, in order to provide a basic understanding of such technologies.

Static Random Access Memory (SRAM) is a type of semiconductor memory such that it does not need to be periodically refreshed. However, semiconductor manufacturing process scaling increases leakage which is problematic for SRAM. As a result of continued scaling of MOS transistors, power dissipation due to leakage currents has increased dramatically and is a source of concern especially for low power applications. However, the read and write speed over SRAM are the fastest and thus SRAM gives us the best I/O performance even though at the cost of the increased power leakage.

Embedded Dynamic Random Access Memory (eDRAM) is a capacitor-based dynamic random access memory usually integrated on the same die or in the same package as the main ASIC or processor. Since capacitors leak charge, the information eventually fades unless the capacitor charge is refreshed periodically. Due to the constant refresh, the power consumption as well as the power leakage is high. However, this power leakage is lower than the SRAM leakage. Moreover, the I/O performance is less than that of SRAM but is better than other RAM technologies.

Phase-change memory (also known as PCM, PRAM, PCRAM, Ovonic Unified Memory, Chalcogenide RAM and CRAM) is a type of non-volatile computer memory. PRAM uses the unique behavior of chalcogenide glass, which can be "switched" between two states, crystalline and amorphous, with the application of heat. The contact between the hot phase-change region and the adjacent dielectric is a concern. For example, the dielectric may begin to leak current at higher temperature; however, this power leakage is very low as compared to other technologies. But comparing the read and write speed with the other RAM technologies, it is observed that PRAM has very slow I/O performance.

Magnetoresistive Random Access Memory (MRAM) stores data as electric charge or current flows, but by magnetic storage elements. The elements are formed from two ferromagnetic plates, each of which can hold a magnetic field, separated by a thin insulating layer. One of the two plates is a permanent magnet set to a particular polarity, and the other plate has a field which changes to match that of an external field. Since MRAM is a non-volatile memory technology, there is no power supply to each MRAM cell such that MRAM cells do not consume any standby leakage power. Therefore, the only leakage power is the circuit leakage power for MRAM caches, which is low compared to the total leakage power for other cache technologies. Even though the power leakage is least, the performance is not very comparable with DRAM or SRAM. Moreover, it is observed that sequential memory access requires less power as compared to random memory access.

SUMMARY

In a first aspect of the invention, a method is implemented in a computer infrastructure having computer executable code tangibly embodied on a computer readable storage medium having programming instructions. The program instructions are operable to monitor access patterns of one or more applications in one or more memory technologies in a computing system. The program instructions are also operable to select a memory technology to store the one or more applications based on the access patterns of the one or more applications.

In another aspect of the invention, a method comprises providing expected I/O performance and power leakage of various memory technologies in at least one hybrid type system. The method further comprises providing constraint functions of an application ($g(x, y)$) including at least one of performance tolerance and access patterns of the application. The access patterns are either sequential or random. The method further comprises determining an optimization function to maximize I/O performance and minimize power leakage for storing the application, based on the constraint functions of the application. The method further comprises selecting a computing system that possesses a memory technology to be used to achieve the performance I/O requirement with minimum power leakage identified in the determining step and storing the application on the memory technology.

In an additional aspect of the invention, a system is implemented in hardware comprises: a memory access pattern monitor to monitor performance tolerance and access patterns of client applications in one or more memories of a computing system; and a memory allocation controller to select a memory technology from one or more memories of a computing system to reduce power leakage and obtain increased I/O performance, based on the monitored performance tolerance and access patterns.

In a further aspect of the invention, a computer program product comprises a computer usable storage medium having readable program code embodied in the storage medium. The computer program product includes at least one component operable to: determine at least one of a performance tolerance and access patterns of a client application; determine an optimization function to maximize I/O performance and minimize power leakage for storing the client application in a memory technology, based on the performance tolerance and access patterns of the client application; and select a computing system that possesses the memory technology to be used to achieve the performance I/O requirement with minimum power leakage identified in the determining step.

In yet another aspect of the invention, a computer system is provided for allocating memory. The system comprises a CPU, a computer readable memory and a computer readable storage media. The system further comprises first program instructions to monitor access patterns of an application. The system further comprises second program instructions to determine an optimization function to maximize I/O performance and minimize power leakage for storing the application in a memory technology, based on the access patterns of the application. The system further comprises third program instructions to select a computing system that possesses the memory technology to be used to achieve the performance I/O requirement with minimum power leakage identified by the second program instructions and based on a service level agreement with a client. The system further comprises fourth program instructions to store the application in the memory technology. The optimization function comprises: a set up of a constrained optimization problem to choose levels of one or more variables, [x1, x2, ..., xn] in order to optimize a value of a function f [x1, x2, ..., xn] subject to constraints g1 [x1, x2, ..., xn], wherein the one or more variables to be optimized include:

f(x): Client Read-Write Performance, and
f(y): Power consumption and leakage; and
the constraints include:
g(x): performance tolerance and access pattern behavior; and
g(y): available memory technology,
where g(x,y) is the constraint function;

$$u = f(x,y) \quad (1)$$

subject to $$g(x,y) = c; \text{ and} \quad (2)$$

$$df = f_x dx + f_y dy = 0; \quad (3)$$

a total differentiation of the constraint function is given as:

$$dg = g_x dx + g_y dy = 0; \text{ and} \quad (4)$$

$$(f_x + \ddot{e} g_x) dx + (f_y + \ddot{e} g_y) dy = 0; \quad (5)$$

wherein equation (5) implies:

$$f_x + \ddot{e} g_x = 0; \text{ and} \quad (6)$$

$$f_y + \ddot{e} g_y = 0; \quad (7)$$

wherein required stationary points of f(x,y) subject to constraints (2) is provided by solving three equations (2), (6) and (7) for three unknowns x, y and ë. The first, second, third and fourth program instructions are stored on the computer readable storage media for execution by the CPU via the computer readable memory.

In still yet another aspect of the invention, a method of deploying a system for allocating memory comprises providing a computer infrastructure operable to: provide expected I/O performance and power leakage of various memory technologies in at least one hybrid type system; provide constraint functions of an application including performance tolerance and access patterns of the application; determine an optimization function to maximize I/O performance and minimize power leakage for storing the application, based on the constraint functions of the application; and select a computing system that possesses a memory technology to be used to achieve the performance I/O requirement with minimum power leakage identified in the determining step and storing the application on the memory technology.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention relates to systems and methods for reducing power consumption and power leakage in hybrid storage clusters by selecting the most efficient memory for a particular process (application). More specifically, the present invention provides systems and methods for reducing power consumption by selecting a particular cache (memory) technology in hybrid storage clusters based on performance requirements and/or other parameters associated with a file (e.g., application). Hereinafter, process(es), application(s) and/or file(s) can be used interchangeable in the present disclosure.

In embodiments, the present invention provides a seamless, dynamic and intelligent selection of cache technology to reduce the effective power consumption and/or power leakage of memory for different applications. For example, advantageously, the systems and methods minimize power leakage and maximize read and write performance, i.e., I/O performance for a client application, by selecting an appropriate cache to serve the file, taking into consideration the performance requirements and access pattern of the file and the underlying memory technology characteristics. In this way, the present invention provides energy management solutions for data centers by significantly lowering the cost spent on power utilized for data access from data centers and data clouds spread across geographies.

In embodiments, the systems and methods of the present invention can be used with a hybrid Network File System (NFS) cluster comprising servers having different types of memory. The systems and methods of the present invention can also be implemented or used with a distributed network, a cloud environment, a single server with multiple memory technologies or several servers, each having the same or different memory technologies. Hereinafter, the above systems will be referred to generally as a hybrid system, which is any system (computing system) having different memory types. These different types of memories include, for example, SRAM, eDRAM, PRAM and/or MRAM, amongst others.

In operation, the systems and methods dynamically select the computing system with the appropriate memory, e.g., SRAM or eDRAM, to serve a client application having certain characteristics appropriate for such memory, e.g., high read write performance requirement. For example, in a hybrid system having multiple RAM technologies, the systems and methods of the present invention select the RAM technology to be used depending on the sequential or random access pattern of the application to minimize the power consumption and the power leakage. More specifically and by way of non-limiting illustrative examples, the systems and methods of the present invention:

Dynamically select the computing system with SRAM or eDRAM memory to serve a client application having high read write performance requirement; and/or Dynamically select the computing system with PRAM or MRAM memory to serve application that can endure a small performance hit to reduce the power leakage and thus save energy without hampering the functioning of the applications.

Figure 1:
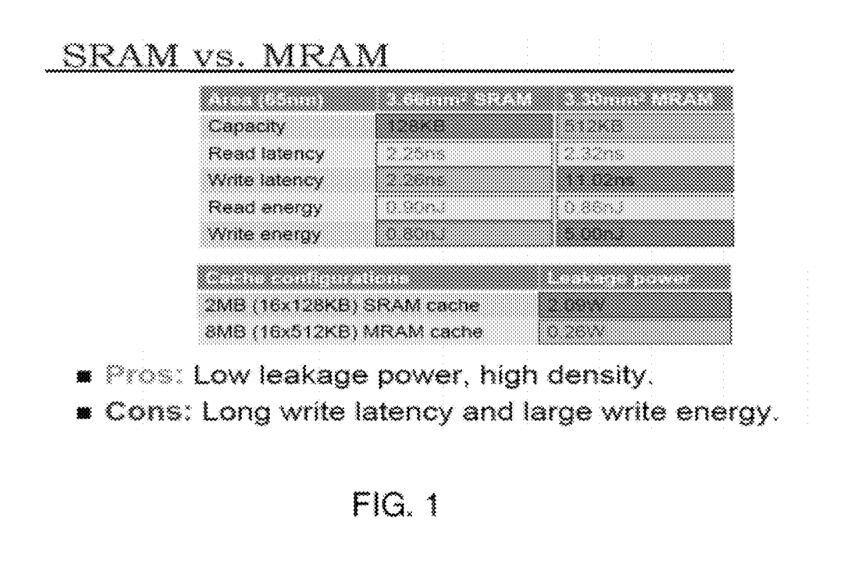
FIGS. 1 and 2 show various tables with characteristics of RAM technologies used in accordance with aspects of the invention.
Figure 2:
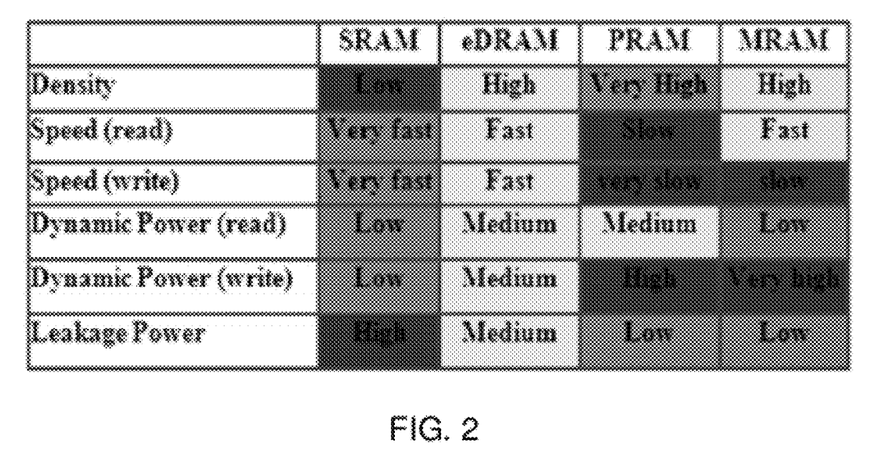

FIGS. 1 and 2 show various tables showing characteristics of RAM technologies used in accordance with aspects of the invention. The tables of FIGS. 1 and 2 can be look-up tables stored in a storage system such as, for example, a database (e.g., storage 22B shown in FIG. 3). By using these tables, the systems and methods of the present invention can select the most efficient memory for a particular application, as discussed in more detail below.

FIG. 1 shows characteristics of SRAM compared to MRAM. More specifically, FIG. 1 shows a comparison of 3.66 mm$^2$ SRAM and 3.30 mm$^2$ MRAM. The comparisons include, for example, capacity, read and write latency and read and write energy. In addition, leakage power for a 2 MB SRAM cache is compared to power leakage for an 8 MB MRAM cache. As shown, SRAM has:

a higher density than MRAM;
a faster read than MRAM;
a slower write than MRAM;
a higher read energy than MRAM; and
a lower write energy than MRAM.

Accordingly, the MRAM provides low leakage power and high density, but has a long write latency and large write energy. Also, as shown, the leakage power is greater for the 2 MB SRAM cache compared to the 8 MB MRAM cache.

FIG. 2 shows a comparison of SRAM, eDRAM, PRAM and MRAM. More specifically, FIG. 2 shows a comparison of these memory technologies with regard to: (i) density, (ii) speed (read), (iii) speed (write), (iv) dynamic power (read), (v) dynamic power (write) and (vi) leakage power. The dynamic power and leakage power are the power drawn by RAM for 1 gigabyte of data. The systems and methods of the present invention are capable of selecting any of these memory technologies based on the particular client application, for most power efficient usage of memory.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CD-ROM),
an optical storage device,
a magnetic storage device, or
any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
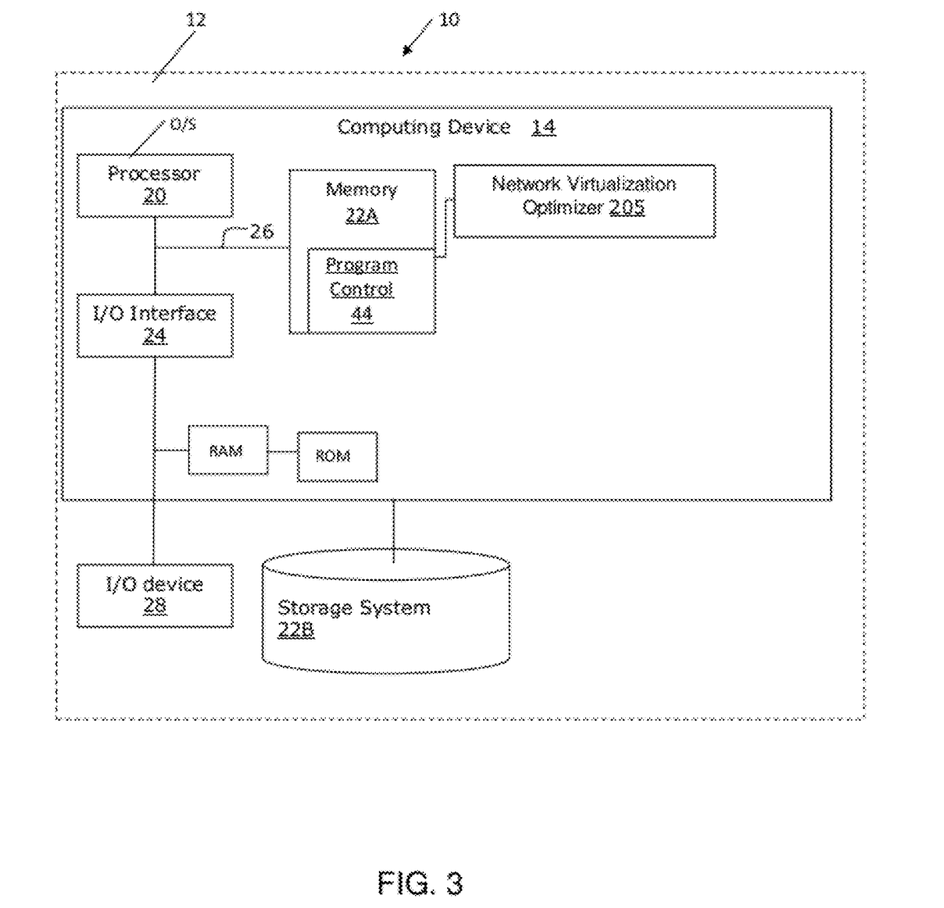
FIG. 3 is an illustrative environment for implementing the steps in accordance with aspects of the invention.

FIG. 3 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 3). The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory or any other volatile memory, as discussed above, (generally referred to as RAM), a read-only memory (ROM), and an operating system (O/S).

The computing device 14 is in communication with the external I/O device/resource 28 and the storage system 22B. The computing device 14 can also be in communication with any number of hybrid systems having different types of memories, shown generally as reference numeral 25. The I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. While executing the computer program code, the processor 20 can read and/or write data to/from memory 22A, storage system 22B, and/or I/O interface 24. The program code executes the processes of the invention. The bus 26 provides a communications link between each of the components in the computing device 14.

In accordance with aspects of the invention, the program control 44 controls a memory access pattern monitor 200 and memory allocation controller 205. The memory access pattern monitor 200 and memory allocation controller 205 can be implemented as one or more program code in the program control 44 stored in memory 22A as separate or combined modules. Additionally, the memory access pattern monitor 200 and memory allocation controller 205 may be implemented as separate dedicated processors or a single or several processors to provide the functioning of these tools.

The memory access pattern monitor 200 and memory allocation controller 205 can be implemented, for example, on a system or on a client system in case of an NFS model. More specifically, the memory access pattern monitor 200 and memory allocation controller 205 can be used to monitor and allocate memories in any number of hybrid systems 25 for a client application. The hybrid systems 25 can include, for example, any combination of a single server (computing system) having multiple memory technologies, multiple servers (computing systems), each having different memory technologies or multiple memory technologies, an NFS server system, a distributed file system and/or a cloud system, each having different memory or multiple memory technologies.

In embodiments, the memory access pattern monitor 200 can monitor memory access patterns in any of the above systems 25, which have implications over the power consumption and leakage. More specifically, the memory access pattern monitor 200 can monitor client applications to determine (or monitor) access (read/write) patterns in any of the memories of the system 25. The memory access pattern monitor 200 can save the access (read/write) patterns in a log, e.g., database 22B, for future reference for memory allocation. Even more specifically, in embodiments, the memory access pattern monitor 200 can determine (monitor and/or track) performance tolerance and access patterns of the client applications in memories of the system 25, and the memory allocation controller 205 can select the most efficient RAM technology to reduce the power leakage and/or obtain the highest (or increased) I/O performance in the systems 25. This RAM will be used to store the data of the applications, in any of the above noted systems 25. Thus, by implementing the present invention, it is possible to optimize, for example, the user read write performance as well as minimize the power consumption or leakage considering the constraints of the application behavior, e.g., its performance tolerance and access pattern, in any hybrid system 25.

By way of illustrative example, once memory access patterns are determined, e.g., read/write ratios, the memory allocation controller 205 can determine which RAM technology (in a particular system 25) to use based on the memory access patterns, for most efficient power consumption. In embodiments, the memory allocation controller 205 can access the look-up tables shown in FIG. 1 or 2 to make a decision as to which memory is most efficient for a particular application, based on the memory access patterns that were, for example, stored in the storage system 22b (e.g., as a profile history of read/write operations of an application which can be maintained in a log).

As an example, since processes performing random I/O require more power, the memory allocation controller 205 will select RAM technologies like PRAM and MRAM for such processes performing random I/O. This will cause the least power leakage. On the other hand, the memory allocation controller 205 will select RAM technologies like SRAM or eDRAM for processes performing sequential I/O, even though they have higher power leakage. In this way, the eventual power leakage will be minimum as lesser power will be required for sequential I/Os.

The problem of optimization of the I/O performance and power consumption or leakage based on the constraints of the RAM technology and the process behavior can be solved by linear programming, implemented by, for example, the memory allocation controller 205 or computing infrastructure of FIG. 3. As one illustrative example, the general set up of a constrained optimization problem is to choose the levels of one or more variables, [x1, x2, . . . , xn] in order to optimize the value of a function "f" [x1, x2, . . . , xn] subject to some constraints g [x1, x2, . . . , xn].

The function "f" is called the objective function, and the set of values of the variables that satisfies the constraints is called the feasible set. In embodiments, the variables to be optimized include, for example, f(x): Client Read-Write Performance, and
f(y): Power consumption and leakage.
The constraints include, for example,
g(x): performance tolerance and access pattern behavior of the process, and
g(y): available RAM (memory) technology,
where g(x,y) is the constraint function.

Thus, the problem to solve can be represented as the problem to optimize $$u=f(x,y) \qquad (1)$$

subject to $$g(x,y)=c. \qquad (2)$$

The Langrange's multiplier method can be used to determine the critical points. An unknown constant is introduced, ë, known as Lagrange multiple. Since the stationary values occur when $f_x=f_y=0$, where, $f_x=\partial f/\partial x$ and $f_y=\partial f/\partial y$ are the partial differentiation of f(x,y) with respect to x and y, respectively, the total differentiation of f(x,y) can be represented as:

$$df=f_x dx+f_y dy=0; \qquad (3)$$

The total differentiation of the constraint function is given as:

$$dg=g_x dx+g_y dy=0; \text{ and} \qquad (4)$$

By multiplying (4) by ë and adding to (3):

$$(f_x+\ddot{e}g_x)dx+(f_y+\ddot{e}g_y)dy=0; \qquad (5)$$

Since a and y are independent variables, (5) implies that $$f_x+\ddot{e}g_x=0 \qquad (6)$$

$$f_y+\ddot{e}g_y=0. \qquad (7)$$

The required stationary points of f(x,y) subject to constraints (2) can be provided by solving three equations (2), (6) and (7) for the three unknowns x, y and ë. In this way, it is possible to provide (allocate) the most efficient memory for a particular process, e.g., read/write schemes. That is, the memory allocation controller 205 can select most efficient RAM technologies (in embodiments also based on a service level agreement) and load the applicable processes (applications/files) into the selected RAM technology of a selected system 25. Thus, by looking to the cache of a memory of a particular, e.g., computing device, to host a particular file, it is now possible to most efficiently allocate memory (e.g., select cache for cache data for a particular application) using the characteristics of the file, e.g., sequential or random read/write operations.

Still referring to FIG. 3, the computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In embodiments, for example, using the memory allocation controller 205, the service provider can select RAM technologies based on service agreements with third parties. As an illustrative example, more efficient RAM allocation can be allocated based on high level agreements; whereas, less efficient RAM allocation can be allocated on a lower level agreement. In additional embodiments, a service provider can provide high access read rates with lower power consumption memories for a high level agreement; whereas, the service provider can provide lower access read rates with higher power consumption memories for a low level agreement.

Flow Diagrams

Figure 4:
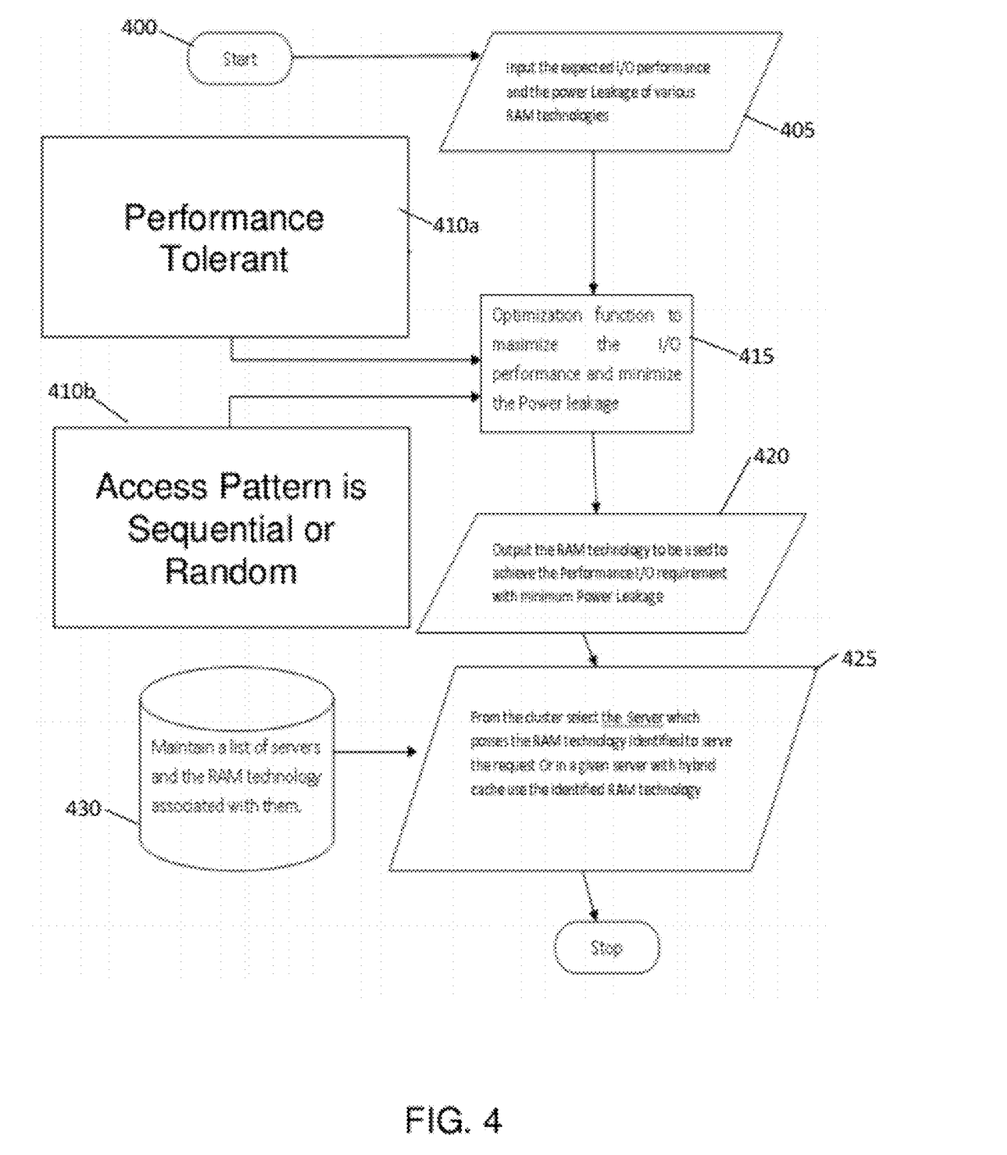
FIGS. 4 and 5 show exemplary flows in accordance with aspects of the invention.
Figure 5:
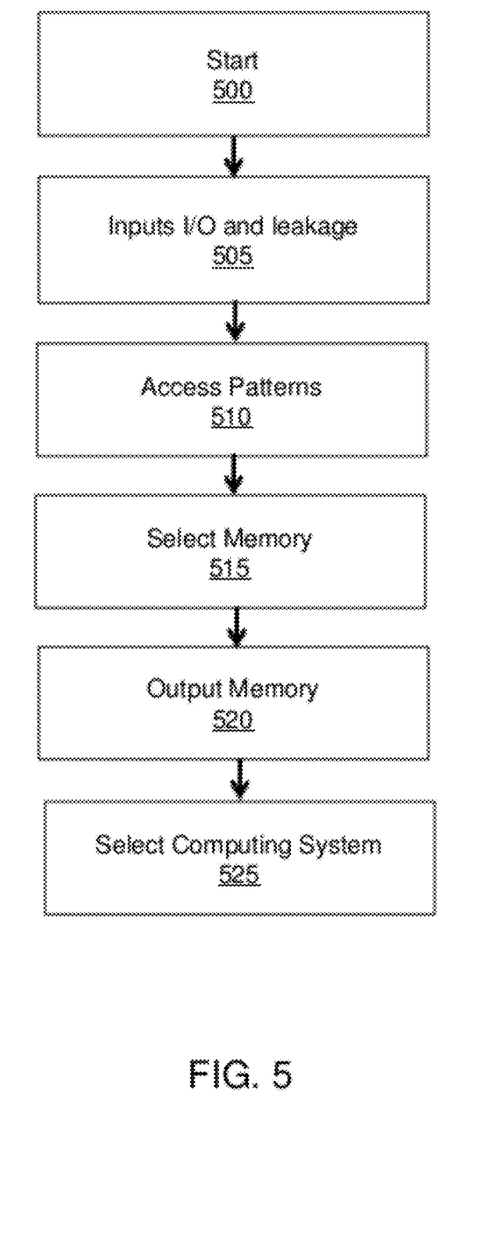

FIGS. 4 and 5 show an exemplary flow for performing aspects of the present invention. The steps of FIGS. 4 and 5 may be implemented in the environment of FIG. 3, for example. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 3. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 4 depicts an exemplary flow for a process in accordance with aspects of the present invention. At step 400, the process starts by, for example, authenticating a user using, for example, Lightweight Directory Access Protocol (LDAP). In embodiments, the LDAP will hold the rules associated with the client (user) such as level of service agreement. As step 405, the process inputs the expected I/O performance and power leakage of various memory technologies in different hybrid systems (e.g., NFS, cloud or other distributed network). This can be accomplished by inputting the data as look-up tables in a database such as, for example, a storage system 22B of FIG. 3. In embodiments, these inputs can be representative of f(x) and f(y).

At steps 410a and 410b, constrain functions (g(x, y)) can be provided into the system. For example, at step 410a, the process determines that the process or application on the hybrid system is performance tolerant. At step 410b, the process determines that the access pattern of the process or application on the hybrid system is either sequential or random. The inputs from steps 405, 410a and 410b are provided to step 415.

At step 415, the process determines the optimization function to maximize the I/O performance and minimize power leakage, based on the characteristics of the application, e.g., access pattern and/or performance tolerance. The process of step 415 can be determined based on the above noted equations. At step 420, the process outputs the RAM (memory) technology to be used to achieve the performance I/O requirement with minimum power leakage. At step 425, the process selects the server (e.g., computing system of a hybrid system) that possesses the RAM (memory) technology identified to serve the request, or in a given server (computing system of a hybrid system) with hybrid cache using the identified RAM (memory) technology. The selected RAM (memory) technology may be selected from the database shown in the representative database, for example, at step 430. The database can be representative of the storage system 22B of FIG. 3, which can maintain a list of severs and RAM (memory) technologies associated with the server (e.g., computing system of a hybrid system as look up tables shown in FIGS. 1 and 2.

FIG. 5 depicts another exemplary flow for a process in accordance with aspects of the present invention. In FIG. 5, the process starts at step 500. Specifically, at step 500, the process starts by, for example, authenticating a user using LDAP. In embodiments, the LDAP will hold the rules associated with the client (user) such as level of service agreement. At step 505, the process inputs the expected I/O performance and power leakage of various memory technologies in different hybrid systems. This can be accomplished by inputting the data of FIGS. 1 and 2 as look-up tables in a database such as, for example, a storage system 22B of FIG. 3. At step 510 the process determines the access patterns of the client applications. At step 515, the system selects the appropriate memory based on the client service agreement and client application. At step 520, the process outputs the RAM (memory) technology to be used to achieve the performance I/O requirement based on the service agreement. At step 525, the process selects the server (computing system) that possesses the RAM (memory) technology identified to serve the request, or in a given server (computing system) with hybrid cache using the identified RAM (memory) technology.

ILLUSTRATIVE INDUSTRIAL APPLICABILITY

The processes (applications and/or files) can be classified into two groups: (i) a group requiring high performance, and (ii) a group tolerant to a performance hit. In embodiments, the application requiring high performance can use RAM technologies like SRAM and eDRAM which provides high performance with high power leakage. However, this is not power efficient for all applications. Instead, the more intelligent way to leverage hybrid RAM technologies is to utilize them efficiently and find an ideal situation between the power leakage and I/O performance. For example, the performance tolerant processes can use PRAM and MRAM technologies to ensure lower power leakage maintaining the I/O performance.

In a first scenario, there are two applications A and B on a computing system with hybrid RAM technology. Application-A has high performance requirement and Application-B can tolerate a hit in the performance. Ideally both the applications would prefer to have the RAM which provides maximum performance even though it is not a need for Application-B. Since RAM technologies with higher performance consume and leak more power, energy is wasted. Accordingly, in this scenario, Application-A can be processed on SRAM or eDRAM (which requires high performance) and Application-B can be processed on PRAM or MRAM, each having a lower power footprint.

In another scenario, Application-D accesses the memory randomly. If Application-D uses the RAM which leaks more power, since random I/O needs more power, the effectual power leakage is higher. Accordingly, in this scenario, Application-D can use, for example, PRAM, which has power savings over SRAM or eDRAM.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a computer infrastructure having computer executable code tangibly embodied on a computer readable storage medium having programming instructions operable to:
   monitor access patterns of one or more applications in two or more memory technologies in a computing system;
   select a memory technology to store the one or more applications based on the access patterns of the one or more applications;
   store the one or more applications in the selected memory technologies; and
   optimize I/O performance and power consumption or leakage based on constraints of the selected memory,
   wherein the selecting the memory technology includes selecting the memory technology that reduces power leakage and obtains an increased I/O performance, compared to other memory technologies;
   wherein a set up of a constrained optimization problem is to choose levels of one or more variables, [x1, x2, . . . , xn] in order to optimize a value of a function f [x1, x2, . . . , xn] subject to constraints g1 [x1, x2, . . . , xn], and
   wherein the one or more variables to be optimized include:
      f(x): Client Read-Write Performance, and
      f(y): Power consumption and leakage; and
   the constraints include:
      g(x): performance tolerance and access pattern behavior; and
      g(y): available memory technology,
   where g(x,y) is the constraint function;

$$u = f(x,y) \quad (1)$$

subject to $$g(x,y) = c; \text{ and} \quad (2)$$

$$df = f_x dx + f_y dy = 0; \quad (3)$$

a total differentiation of the constraint function is given as:

$$dg = g_x dx + g_y dy = 0; \text{ and} \quad (4)$$

$$(f_x + \ddot{e}g_x)dx + (f_y + \ddot{e}g_y)dy = 0; \quad (5)$$

wherein equation (5) implies:

$$f_x + \ddot{e}g_x = 0; \text{ and} \quad (6)$$

$$f_y + \ddot{e}g_y = 0; \quad (7)$$

wherein required stationary points of f(x,y) subject to constraints (2) is provided by solving three equations (2), (6) and (7) for three unknowns x, y and ë.

2. The method of claim 1, wherein the access patterns are read and access operations in random and sequential operations.

3. The method of claim 1, wherein the selecting the memory technology includes selecting a particular cache type in a hybrid computing system.

4. The method of claim 3, wherein the hybrid computing system includes at least one of a single server having multiple memory technologies, multiple servers, each having different memory technologies or multiple memory technologies, a Network File Systems (NFS), a distributed file system and/or a cloud system, each having different memory or multiple memory technologies.

5. The method of claim 1, further comprising saving the memory access patterns in a log for future retrieval.

6. The method of claim 1, further comprising determining performance tolerance of the one or more applications in the two or more memory technologies and selecting the memory technology based, in part, on the performance tolerance.

7. The method of claim 1, wherein steps of claim 1 are provided by a service provider on a subscription, advertising, and/or fee basis.

8. The method of claim 1, wherein a service provider at least one of creates, maintains, deploys and supports the computer infrastructure.

9. The method of claim 1, further comprising authenticating a user using Lightweight Directory Access Protocol (LDAP).

10. A method comprising:
   providing expected I/O performance and power leakage of various memory technologies in at least one hybrid type system;
   providing constraint functions of an application (g(x, y)) including at least one of an performance tolerance and access patterns of the application, wherein the access patterns are either sequential or random;
   determining an optimization function, using a processor, to maximize I/O performance and minimize power leakage for storing the application, based on the constraint functions of the application; and
   selecting a computing system that possesses a memory technology to be used to achieve the performance I/O requirement with minimum power leakage identified in the determining step and storing the application on the memory technology,
   wherein the optimization function comprises:
   a set up of a constrained optimization problem to choose levels of one or more variables, [x1, x2, . . . , xn] in order to optimize a value of a function f [x1, x2, . . . , xn] subject to constraints g1 [x1, x2, . . . , xn],
   wherein the one or more variables to be optimized include:
      f(x): Client Read-Write Performance, and
      f(y): Power consumption and leakage; and
   the constraints include:
      g(x): performance tolerance and access pattern behavior; and
      g(y): available memory technology,
   where g(x,y) is the constraint function;

$$u = f(x,y) \quad (1)$$

subject to $$g(x,y) = c; \text{ and} \quad (2)$$

$$df = f_x dx + f_y dy = 0; \quad (3)$$

a total differentiation of the constraint function is given as:

$$dg = g_x dx + g_y dy = 0; \text{ and} \quad (4)$$

$$(f_x + \ddot{e}g_x)dx + (f_y + \ddot{e}g_y)dy = 0; \quad (5)$$

wherein equation (5) implies:

$$f_x + \ddot{e}g_x = 0; \text{ and} \quad (6)$$

$$f_y + \ddot{e}g_y = 0; \quad (7)$$

wherein required stationary points of f(x,y) subject to constraints (2) is provided by solving three equations (2), (6) and (7) for three unknowns x, y and ë.

11. The method of claim 10, wherein the selecting the computing system is provided by selecting the memory technology from a plurality of memory technologies in a look up table stored in a database.

12. The method of claim 10, wherein the selecting is based on a service level agreement.

13. A system implemented in hardware, comprising:
at least one processor to monitor performance tolerance and access patterns of client applications in one or more memories of a computing system; and
the at least one processor to select a memory technology from one or more memories of a computing system to optimize I/O performance and power consumption or leakage based on constraints of the selected memory technology,
wherein a set up of a constrained optimization problem to choose levels of one or more variables, [x1, x2, . . . , xn] in order to optimize a value of a function f [x1, x2, . . . , xn] subject to constraints g1 [x1, x2, . . . , xn],
wherein the one or more variables to be optimized include:
f(x): Client Read-Write Performance, and
f(y): Power consumption and leakage; and
the constraints include:
g(x): performance tolerance and access pattern behavior; and
g(y): available memory technology,
where g(x,y) is the constraint function;

$$u = f(x,y) \quad (1)$$

subject to $$g(x,y) = c; \text{ and} \quad (2)$$

$$df = f_x dx + f_y dy = 0; \quad (3)$$

a total differentiation of the constraint function is given as:

$$dg = g_x dx + g_y dy = 0; \text{ and} \quad (4)$$

$$(f_x + \ddot{e} g_x) dx + (f_y + \ddot{e} g_y) dy = 0; \quad (5)$$

wherein equation (5) implies:

$$f_x + \ddot{e} g_x = 0; \text{ and} \quad (6)$$

$$f_y + \ddot{e} g_y = 0; \quad (7)$$

wherein required stationary points of f(x,y) subject to constraints (2) is provided by solving three equations (2), (6) and (7) for three unknowns x, y and ë.

14. The system of claim 13, further comprising a storage system for logging the access pattern.

15. The system of claim 13, wherein the memory access pattern monitor and the memory allocation controller are implemented on a system or on a client system in case of an NFS model.

16. The system of claim 13, wherein the computing system is at least one of a single server having multiple memory technologies, multiple servers, each having different memory technologies or multiple memory technologies, an NFS server system, a distributed file system and a cloud system, each having different memory or multiple memory technologies.

17. A computer program product comprising a computer usable storage device having readable program code embodied in the storage device, the computer program product includes at least one component operable to:
determine at least one of a performance tolerance and access patterns of a client application;
determine an optimization function to maximize I/O performance and minimize power leakage for storing the client application in a memory technology, based on the performance tolerance and access patterns of the client application; and
select a computing system that possesses the memory technology to be used to achieve the performance I/O requirement with minimum power leakage identified in the determining step,
wherein the optimization function comprises:
a set up of a constrained optimization problem to choose levels of one or more variables, [x1, x2, . . . , xn] in order to optimize a value of a function f [x1, x2, . . . , xn] subject to constraints g1 [x1, x2, . . . , xn],
wherein the one or more variables to be optimized include:
f(x): Client Read-Write Performance, and
f(y): Power consumption and leakage; and
the constraints include:
g(x): performance tolerance and access pattern behavior; and
g(y): available memory technology,
where g(x,y) is the constraint function:

$$u = f(x,y) \quad (1)$$

subject to $$g(x,y) = c; \text{ and} \quad (2)$$

$$df = f_x dx + f_y dy = 0; \quad (3)$$

a total differentiation of the constraint function is given as:

$$dg = g_x dx + g_y dy = 0; \text{ and} \quad (4)$$

$$(f_x + \ddot{e} g_x) dx + (f_y + \ddot{e} g_y) dy = 0; \quad (5)$$

wherein equation (5) implies:

$$f_x + \ddot{e} g_x = 0; \text{ and} \quad (6)$$

$$f_y + \ddot{e} g_y = 0; \quad (7)$$

wherein required stationary points of f(x,y) subject to constraints (2) is provided by solving three equations (2), (6) and (7) for three unknowns x, y and ë.

18. A computer system for allocating memory, the system comprising:
a CPU, a computer readable memory and a computer readable storage media;
first program instructions to monitor access patterns of an application;
second program instructions to determine an optimization function to maximize I/O performance and minimize power leakage for storing the application in a memory technology, based on the access patterns of the application;
third program instructions to select a computing system that possesses the memory technology to be used to achieve the performance I/O requirement with minimum power leakage identified by the second program instructions and based on a service level agreement with a client; and
fourth program instructions to store the application in the memory technology, wherein
the optimization function comprises:
a set up of a constrained optimization problem to choose levels of one or more variables, [x1, x2, . . . , xn] in order to optimize a value of a function f [x1, x2, . . . , xn] subject to constraints g1 [x1, x2, . . . , xn], wherein
the one or more variables to be optimized include:
f(x): Client Read-Write Performance, and
f(y): Power consumption and leakage; and
the constraints include:

g(x): performance tolerance and access pattern behavior; and g(y): available memory technology, where g(x,y) is the constraint function;

$$u=f(x,y) \quad (1)$$

subject to $$g(x,y)=c; \text{ and} \quad (2)$$

$$df=f_x dx+f_y dy=0; \quad (3)$$

a total differentiation of the constraint function is given as:

$$dg=g_x dx+g_y dy=0; \text{ and} \quad (4)$$

$$(f_x+\ddot{e}g_x)dx+(f_y+\ddot{e}g_y)dy=0; \quad (5)$$

wherein equation (5) implies:

$$f_x+\ddot{e}g_x=0; \text{ and} \quad (6)$$

$$f_y+\ddot{e}g_y=0; \quad (7)$$

wherein required stationary points of f(x,y) subject to constraints (2) is provided by solving three equations (2), (6) and (7) for three unknowns x, y and ë, the first, second, third and fourth program instructions are stored on the computer readable storage media for execution by the CPU via the computer readable memory.

19. A method of deploying a system for allocating memory comprising:

providing a computer infrastructure, being operable to:

provide expected I/O performance and power leakage of various memory technologies in at least one hybrid type system;

provide constraint functions of an application including performance tolerance and access patterns of the application;

determine an optimization function to maximize I/O performance and minimize power leakage for storing the application, based on the constraint functions of the application; and select a computing system that possesses a memory technology to be used to achieve the performance I/O requirement with minimum power leakage identified in the determining step and storing the application on the memory technology, wherein the optimization function comprises:

a set up of a constrained optimization problem to choose levels of one or more variables, [x1, x2, . . . , xn] in order to optimize a value of a function f [x1, x2, . . . , xn] subject to constraints g1 [x1, x2, . . . , xn], wherein the one or more variables to be optimized include:

f(x): Client Read-Write Performance, and f(y): Power consumption and leakage; and the constraints include:

g(x): performance tolerance and access pattern behavior; and g(y): available memory technology, where g(x,y) is the constraint function:

$$u=f(x,y) \quad (1)$$

subject to $$g(x,y)=c; \text{ and} \quad (2)$$

$$df=f_x dx+f_y dy=0; \quad (3)$$

a total differentiation of the constraint function is given as:

$$dg=g_x dx+g_y dy=0; \text{ and} \quad (4)$$

$$(f_x+\ddot{e}g_x)dx+(f_y+\ddot{e}g_y)dy=0; \quad (5)$$

wherein equation (5) implies:

$$f_x+\ddot{e}g_x=0; \text{ and} \quad (6)$$

$$f_y+\ddot{e}g_y=0; \quad (7)$$

wherein required stationary points of f(x,y) subject to constraints (2) is provided by solving three equations (2), (6) and (7) for three unknowns x, y and ë.

20. The method of claim 19, wherein a service provider at least one of creates, maintains, deploys and supports the computer infrastructure.

* * * * *